United States Patent
Campbell

(10) Patent No.: US 9,025,081 B2
(45) Date of Patent: May 5, 2015

(54) TIME LAG DETERMINATION BETWEEN AUDIO CHANNELS

(75) Inventor: Robert Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2503 days.

(21) Appl. No.: 11/741,117

(22) Filed: Apr. 27, 2007

(65) Prior Publication Data

US 2008/0266451 A1  Oct. 30, 2008

(51) Int. Cl.
| | |
|---|---|
| H04N 5/04 | (2006.01) |
| H04N 9/44 | (2006.01) |
| H04N 9/475 | (2006.01) |
| H04N 17/00 | (2006.01) |
| H04N 17/02 | (2006.01) |
| H04N 5/765 | (2006.01) |
| H04N 5/932 | (2006.01) |
| H04N 5/935 | (2006.01) |

(52) U.S. Cl.
CPC .................................... *H04N 5/04* (2013.01)

(58) Field of Classification Search
None
See application file for complete search history.

(56) References Cited

U.S. PATENT DOCUMENTS

| | | | |
|---|---|---|---|
| 6,512,884 B1 * | 1/2003 | Sawada | 386/203 |
| 7,646,833 B1 * | 1/2010 | He et al. | 375/346 |
| 2005/0219366 A1 * | 10/2005 | Hollowbush et al. | 348/193 |
| 2006/0290810 A1 * | 12/2006 | Mallinson | 348/515 |
| 2008/0044160 A1 * | 2/2008 | Maegaki | 386/96 |

* cited by examiner

*Primary Examiner* — Jefferey Harold
*Assistant Examiner* — Sean Haiem
(74) *Attorney, Agent, or Firm* — Conley Rose, P.C.

(57) ABSTRACT

A system comprises logic adapted to concurrently provide an electrical signal to each of a plurality of audio channels. An acoustic sensor is coupled to the logic. The acoustic sensor receives sound signals generated based on the electrical signals. The logic further determines a time lag between the received sound signals.

20 Claims, 3 Drawing Sheets

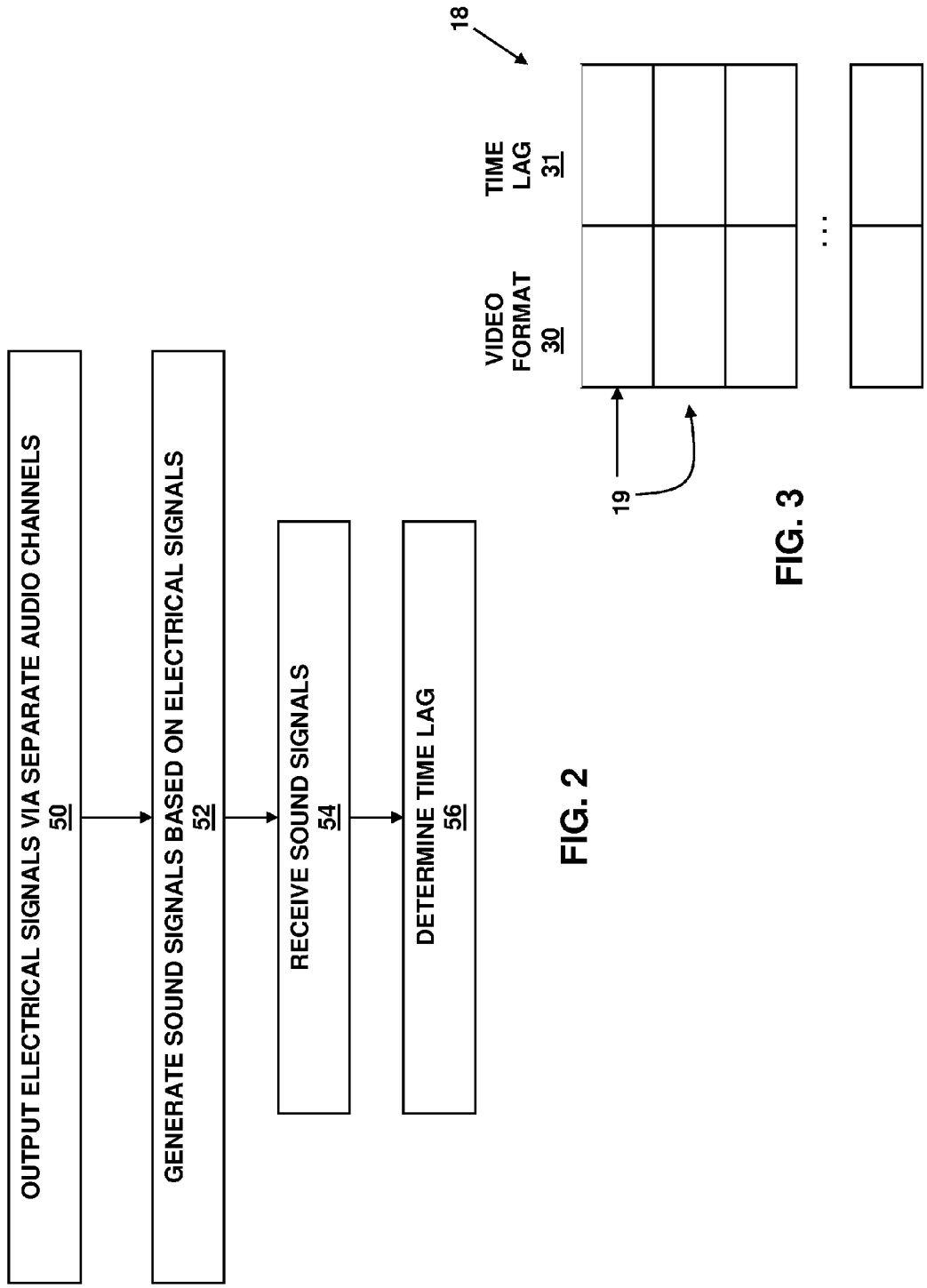

TIME LAG DETERMINATION BETWEEN AUDIO CHANNELS

BACKGROUND

A high definition television (HDTV) comprises an audio/video decoder that decodes an incoming digital bitstream from a cable box, set top box, etc. for subsequent playback on display monitor and/or speaker. The incoming digital bitstream comprises audio and video information. A finite amount of time is required for the decoder to decode the audio/video bit stream. In some applications, a user turns the volume down on the HDTV so that the video is seen but the audio is not heard by the HDTV's speakers. Rather than using the audio speakers built into the HDTV, the user instead may prefer to have the audio provided by speakers coupled to, for example, the cable box or a stereo coupled to the cable box. In this latter configuration, the audio being heard from the speakers coupled to the cable box is not subject to the same time lag that results from the HDTV decoding the digital bit stream containing the video information. As a result, the video being played on the HDTV may lag behind the audio and thus be out of synchronization with respect to the audio.

BRIEF DESCRIPTION OF THE DRAWINGS

For a detailed description of exemplary embodiments of the invention, reference will now be made to the accompanying drawings in which:

FIG. 2 shows a method in accordance with embodiments of the invention;

FIG. 3 illustrates the contents of storage in the system of FIG. 1; and

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
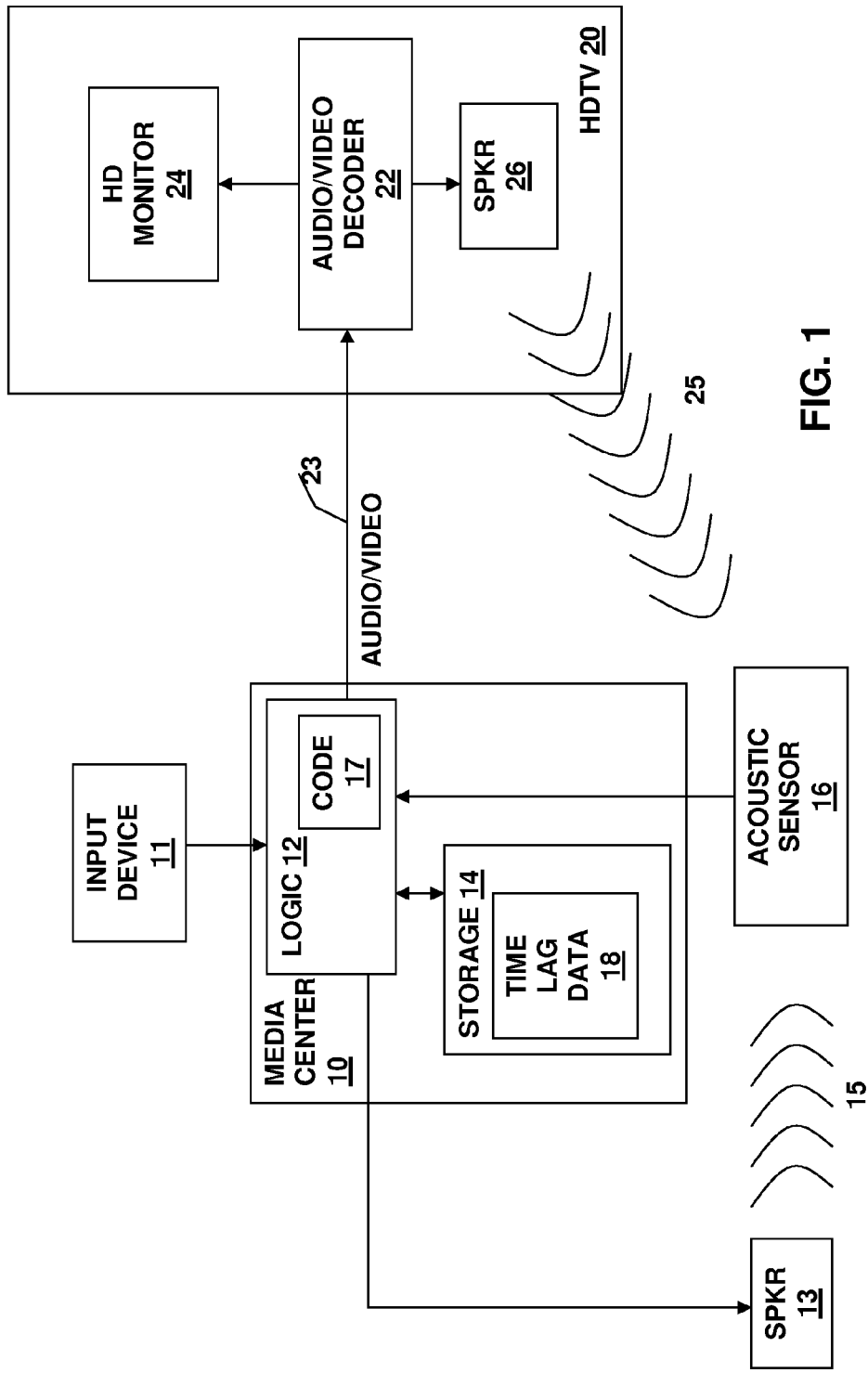
FIG. 1 shows a system in accordance with embodiments of the invention.

FIG. 1 shows a system comprising an electronic device 10 coupled to a playback device 20. In various embodiments, the electronic device 10 comprises a media center and is referred to as such in this disclosure. Further, the playback device 20 comprises a television such as an HDTV. In this disclosure, an HDTV comprises a television with a resolution greater than the National Television Systems Committee (NTSC) standard of 525 lines of resolution.

The media center 10 provides an audio/video bitstream 23 to the HDTV 20. The HDTV 20 comprises an audio/video decoder 22 coupled to a high definition (HD) monitor and one or more speakers 26. The audio/video bit stream 23 is decoded by the audio/video decoder 22. The decoder 22 extracts video information from the audio/video bit stream 23 and provides the video information to the HD monitor 24 for display thereon. Similarly, the decoder 22 extracts audio information from the audio/video bit stream and provides the audio information to the speaker 26 for playback.

The media center 10 comprises logic 12 that is adapted to couple to an input device 11, storage 14, a speaker 13, and an acoustic sensor 16. In accordance with various embodiments, the logic 12 comprises a processor that executes code 17. In some embodiments, one or more all of the functions performed by the media center 10 described herein are caused to be performed by processor execution of the code 17.

The input device 11 comprises a keypad or other type of user input control for the media center 10. In some embodiments, the speaker 13 is integrated into the media center 10, while in other embodiments, the speaker 13 is separate from, but coupled to, the media center 10. In some configurations, the speaker 13 connects directly to the media center 10, while in other configurations, the speaker 13 connects to a stereo system that, in turn, connects to the media center 10. The logic 12 comprises an audio subsystem (e.g., audio amplifier, filters, etc.) that generates an audio electrical signal to be provided to the speaker 13. In other embodiments, an audio subsystem is separate from logic 12. The storage 14 comprises volatile memory (e.g., random access memory), non-volatile memory (e.g., hard disk drive, Flash memory, etc.) or combinations thereof.

The acoustic sensor 16 is integrated into the media center 10 or is a separate device that couples to the media center via a cable or other type of communication mechanism. In various embodiments, the acoustic sensor 16 detects sound. In some embodiments, the acoustic sensor 16 detects sound having a frequency having a frequency above what most humans can hear (e.g., above 20,000 Hz). In various embodiments, the acoustic sensor 16 detects ultrasonic sound waves. The acoustic sensor converts input sound signals into an electrical signal that is provided to logic 12. Speakers 13 and 26 are capable of reproducing sound detectable by humans (e.g., in range of 10 Hz to 20 KHz) and also undetectable by humans (e.g., above 20 KHz, ultrasonic, etc.).

The media center 10 comprises multiple audio channels. One audio channel comprises speaker 13. Another audio channel comprises the audio/video bit stream 23 and the HDTV's speaker 26. Additional audio channels can be provided in media center 10 as desired.

The user may choose to view video on the HDTV 20 while listening to the accompanying audio via a speaker other than the HDTV's speaker 26. For example, the user may choose to mute the HDTV's speaker 26 and listen to audio instead via speaker 13 coupled to the media center 10. In such a configuration, the audio/video decoder 22 takes time to decode the video information. The decoder 22 generally takes more time to decode the video in the bitstream 23 than the time required by the media center 10 to generate audio electrical signals to drive speaker 13. Thus, the sound produced by speaker 13 may not be synchronized with the video displayed on HDTV 20. For example, the video displayed on HDTV 20 may lag behind the sound produced by speaker 13. The disclosed embodiment determines the time lag and applies a delay equal to the time lag to the signal that is "ahead of" the lagging signal. For example, if the video lags the audio by 0.2 seconds, a 0.2 second time lag is applied to the audio signal to slow it down to be synchronous with the video signal.

In accordance with various embodiments, the media center 10 uses the acoustic sensor 16 to determine the time lag and apply the appropriate delay. In some embodiments, the logic 12 in the media center 10 concurrently provides an electrical signal to each of multiple audio channels. Each electrical signal causes a speaker associated with the associated channel to produce a sound signal based on the electrical signal. That is, the each speaker 13, 26 converts an input electrical signal to a corresponding sound signal. Referring to FIG. 1, speaker 13 in one audio channel generates sound signals 15 and speaker 26 in the HDTV 20 in another audio channel generates sound signals 25. The acoustic sensor 16 converts the received sound signals 15, 25 to a combined electrical signal that is provided to logic 12.

The sound signals 15 and 26 are received by the acoustic sensor 16. The acoustic sensor's output is provided to the logic 12 which determines the time lag between reception of the sound signals 15 and 26. For example, the acoustic sensor 16 may begin receiving the sound signal 15 from the media center's speaker 13 before beginning to receive the sound signal 25 from the HDTV's speaker 26. The time difference (lag) is determined by the logic 12.

FIG. 2 illustrates a corresponding method. At 50, the method comprises the logic 12 of the media center 10 simultaneously outputting a plurality of electrical signals, each through a separate audio channel. For example, one electrical is provided to the HDTV 20 and another electrical signal is provided to speaker 13. The electrical signals cause corresponding sound signals to be generated by speakers 13 and 36 (52). Speaker 13 generates sound signal 15 and speaker 26 in the HDTV 20 generates sound signal 25. In at least some embodiments, the electrical signals output to each audio channel have different frequencies, and thus the corresponding sound signals have different frequencies. By way of example, the frequency of one electrical signal and its corresponding sound signal is 20 KHz and the frequency of another electrical signal and its corresponding sound signal is 22 KHz. Either or both of the frequencies can be within or above the range detectable by human hearing.

At 54, the acoustic sensor 16 receives the sound signals 15, 25. At 56, the method comprises determining a time lag between said received sound signals 15 and 25. Because, in some embodiments, the two sound signals 15, 25 have different frequencies (e.g., 20 KHz and 22 KHz), the logic 12 is able to discriminate the two sound signals from the combined electrical signal provided by the acoustic sensor 16. The logic 12 is thus able to determine (e.g., measure, compute, estimate, etc.), the time lag between the two sound signals. That the time lag is different than zero will largely be due to the audio decoding process performed by the HDTV's audio/video decoder 22.

In other embodiments, the media center 10 serially outputs electrical signals through separate audio channels. In this embodiment, the media center outputs one electrical signal through one audio channel and calculates the time from the outputting of the electrical signal until the sound is detected. The media center then outputs the next electrical signal through a separate audio channel and calculates its time until the sound is detected. The times are compared to determine a time lag.

Once the time lag is determined between the sound signals, the logic 12 of the media center 10 can use the time lag in a variety of manners. In one embodiment, for example, the media center applies the time lag to the audio channel which outputs the electrical signal resulting in the earliest received sound signal at the acoustic sensor 16. That is, if the acoustic sensor 16 and logic 12 determine that the sound signal 15 from speaker 13 arrived at the acoustic sensor 16 before the sound signal 25 from the HDTV's speaker 26, the logic 12 applies the determined time lag to audio provided to speaker 13 to thereby synchronize it to the video provided to the HDTV 20. On the other hand, if the acoustic sensor 16 and logic 12 determine that the sound signal 26 from the HDTV's speaker 26 arrived at the acoustic sensor 16 before the sound signal 15 from speaker 13, the logic 12 applies the determined time lag to video provided to the HDTV 20 to thereby synchronize it to the audio provided to the speaker 13.

In accordance with at least one embodiment, the determined time lag is stored in time lag data 18 in the media center's storage 14. The time lag is, at least in part, a function of the format of the audio/video bit stream provided to the HDTV 20. For example, assume the native resolution of the HD monitor 24 is 1080i. If the audio/video bitstream 23 has data encoded in a 1080i format, then the audio/video decoder 22 takes some time to decode the bitstream, but not has much time as would be needed if the bitstream 23 had data encoded in a different format. For example, if the bitstream 23 had data encoded in a 480i format, then the audio/video decoder 22 would have to "up-sample" the 480i data to the 1080i format. All else being equal, decoding a 480i bitstream for a 1080i monitor requires more time than decoding a bitstream that is already in the 1080i native resolution of the monitor.

Accordingly, in some embodiments the media center 10 determines the time lag for each of multiple video formats. In some embodiments, the determination of time lags for various video formats is accomplished by repeating the actions of illustrative method of FIG. 2 for each supported video format. The determined time lags and their corresponding video formats are stored as time lag data 18 in storage 14. FIG. 3 illustrates an embodiment of the time lag data 18. The time lag data 18 of FIG. 3 comprises multiple entries 19. Each entry comprises an identity 30 of a video format (e.g., 480i, 1080i) and a corresponding value 32 indicative of a time lag.

In at least some embodiments, the time lag associated with each of multiple video formats supported by the media center and HDTV 20 is pre-determined and stored in storage 14. The pre-determination of time lags can be performed during a user-initiated calibration mode of the media center. The calibration mode can be initiated by a user via input device 11. In the calibration mode, the media center 10 provides video to HDTV 20 in a first video format. The media center 10 provides electrical signals to cause sound to be generated by two or more audio channels and determines the time lag corresponding to the first video format. That information (time lag and video format) is stored in time lag data 18. The media center 10 then changes to a different video format and repeats the process to determine a new time, and also stores the newly determined time lag in time lag data 18. This process repeats for, if desired, all supported video formats or until terminated by the user.

Figure 4:
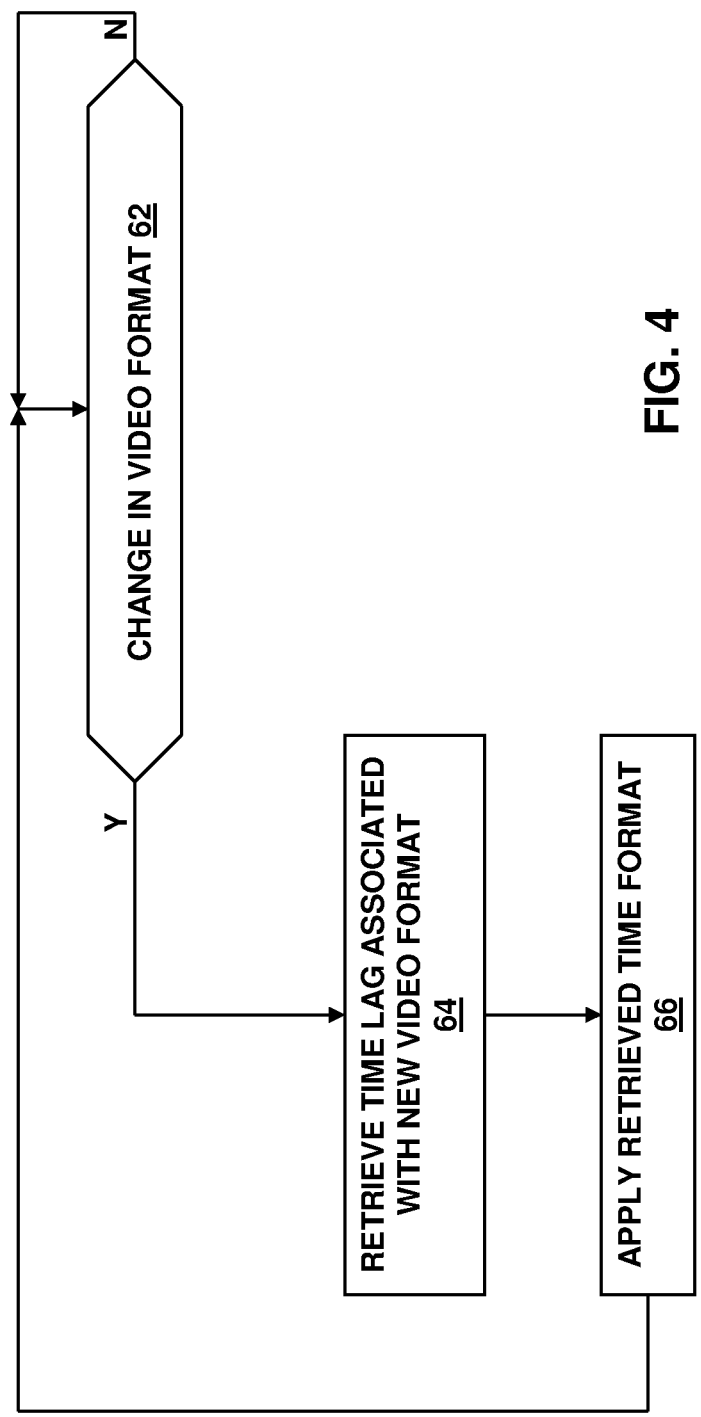
FIG. 4 shows another method in accordance with embodiments of the invention.

During run-time and referring to FIGS. 1, 3, and 4 (which illustrates a suitable method), if the media center 10 is currently providing a bitstream with video in a particular format (e.g., 480i) and then at 62 detects a change in, or begins to provide, a bitstream that encodes video in a different format (e.g., 1080i), the logic 12 accesses the time lag data 18 to retrieve the time lag associated with the new video format (64). As the logic 12 begins to provide the bitstream with the new video format, the logic 12 also applies the correct time lag (66). Each entry 19 of the time lag data 18 may also comprise an identity of the particular audio channel to which the time lag 32 should be applied. Thus, when the logic 12 applies the time lag, the logic applies the time lag to the correct audio channel.

In the embodiment described above, the time lags for multiple supported video format are pre-determined during a calibration mode. In accordance with other embodiments, the time lag associated with each of the multiple video formats supported by the media center and HDTV 20 is not pre-determined. Instead, the media center 10 determines the a time lag for a video format "on the fly." That is, as the logic 12 changes from one video format to another, the logic 12 causes the sound signals to be emitted from the speakers 13 and 26 and determines the time lag at that time. In some embodiments, the logic 12 determines a new time lag each time a change in video format occurs.

In some embodiments, however, the logic 12 saves each newly determined time lag and associated video format in time lag storage 18 for subsequent use. In such embodiments, a calibration mode can be performed if desired as described above. If a calibration mode is not provided or not performed by the user, the logic 12 will determine the time lag for each of the supported video formats as each such video format is actually played through the HDTV 20.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    logic adapted to provide an electrical signal to each of a plurality of audio channels, said audio channels including a first audio channel that is part of a high definition audio/video bit stream and a second audio channel that is not part of a high definition audio/video bit stream; and
    an acoustic sensor coupled to said logic, said acoustic sensor receives sound signals from said audio channels that are generated based on said electrical signals;
    wherein said logic processes said received sound signals to determine a time lag between said first audio channel and said second audio channel.

2. The system of claim 1 wherein said logic applies said time lag to the audio channel which output the electrical signal resulting in an earliest received sound signal at the acoustic sensor.

3. The system of claim 1 further comprising storage coupled to said logic, said logic stores a value indicative of said time lag in said storage.

4. The system of claim 1 wherein said logic determines a plurality of time lags, each time lag associated with a different video format.

5. The system of claim 4 wherein said logic detects a change in the video format and applies a time lag associated with the newly detected video format.

6. The system of claim 4 further comprising storage coupled to said logic, and wherein said logic stores each of said plurality of time lags in said storage.

7. The system of claim 1 wherein said logic provides a first electrical signal having a first frequency to the first audio channel and a second electrical signal having a second frequency to the second audio channel, wherein the first and second frequencies are different.

8. The system of claim 1 wherein the sound signals have a frequency greater than or equal to 20,000 Hz.

9. The system of claim 1 wherein said logic is configured to provide the high definition video bit stream to a high definition television.

10. A system, comprising:
    means for outputting a plurality of electrical signals, each through a separate audio channel, a first audio channel part of a high definition audio/video bit stream and a second audio channel that is not part of a high definition audio/video bit stream;
    means for receiving sound signals generated based on said electrical signals; and
    means for processing said received sound signals to determine a time lag between said first audio channel and second audio channel.

11. The system of claim 10 further comprising means for applying the time lag to the audio channel which output the electrical signal resulting in an earliest arriving sound signal.

12. The system of claim 10 further comprising means for determining a plurality of time lags, each time lag associated with a different video format.

13. The system of claim 12 further comprising means for detecting a change in the video format and for applying a time lag associated with the newly detected video format.

14. The system of claim 10 wherein the means for outputting the plurality of electrical signals is for outputting electrical signals at different frequencies.

15. A method, comprising:
    outputting a plurality of electrical signals through a first audio channel that is part of a high definition audio/video bit stream and a second audio channel that is not part of a high definition audio/video bit stream;
    receiving sound signals generated based on said electrical signals; and
    determining a time lag between said first and second audio channels.

16. The method of claim 15 further comprising applying the time lag to the audio channel which output the electrical signal resulting in an earliest arriving sound signal.

17. The method of claim 15 further comprising storing said time lag.

18. The method of claim 15 further comprising repeating said outputting, receiving and determining for each of a plurality of video formats thereby determining a plurality of time lags.

19. The method of claim 18 further comprising detecting a change in the video format and applying a time lag associated with the newly detected video format.

20. The method of claim 15 wherein outputting the plurality of electrical signals comprising outputting electrical signals at different frequencies.

* * * * *